March 12, 1957 L. F. BONZA ET AL 2,784,926
PROTECTED AIRCRAFT ENCLOSURES
Filed March 30, 1953 2 Sheets-Sheet 1
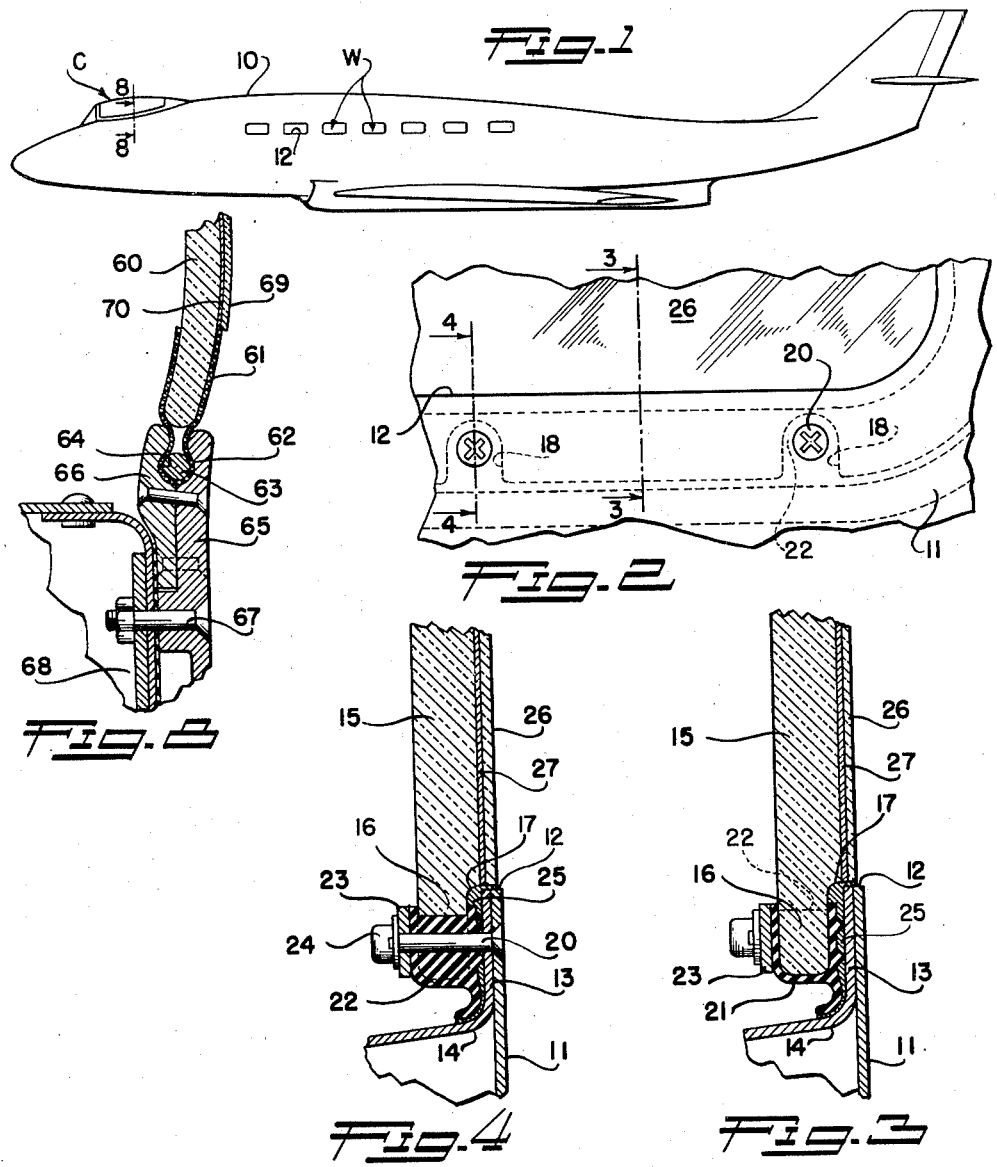
INVENTORS
LOUIS F. BONZA
MAX W. MUELLER
By George C. Sullivan
Agent March 12, 1957    L. F. BONZA ET AL    2,784,926
PROTECTED AIRCRAFT ENCLOSURES
Filed March 30, 1953    2 Sheets-Sheet 2

INVENTORS
LOUIS F. BONZA
MAX W. MUELLER
By George C. Sullivan
Agent

United States Patent Office 2,784,926
Patented Mar. 12, 1957

2,784,926

PROTECTED AIRCRAFT ENCLOSURES

Louis F. Bonza, Tujunga, and Max W. Mueller, Northridge, Calif., assignors to Lockheed Aircraft Corporation, Burbank, Calif.

Application March 30, 1953, Serial No. 345,638

13 Claims. (Cl. 244—129)

This invention relates, generally, to glazing, and relates more specifically to the transparent closures, windows, enclosures, etc. of aircraft and the like.

It has been found that the outer surfaces of the transparent enclosures and windows of pressurized aircraft are critically sensitive to nicking, chipping, scratching, abrasion, etc. but that similar damage on the inner surfaces virtually unaffect the integrity of the enclosures. Due to the pressure differentials across a window or enclosure of a pressurized airplane the outer surface of the enclosure is the tension side and the inner surface is the compression side and this apparently accounts for the extreme sensitivity of the outer side. Damage to the outer side of the enclosure may be caused by the in-flight or in-motion impact of sand, gravel and ice pellets, may be caused during handling, installing and cleaning of the enclosure, as well as by weathering and contaminants. Damage to the outer side, even though apparently slight, may result in actual failure of the window or enclosure during flight with the accompanying possibility of injury or death to the passengers or crew members. So far as we are aware, no attempts have been made to protect the critically sensitive outer surfaces of such windows or enclosures although partial compensation for the lack of surface protection may be achieved by increasing the thickness of the basic enclosure or by laminating together two or more basic enclosure members. However, such measures as just mentioned substantially increase the weight and cost of the enclosure and provide no real protection or assurance against in-flight failure.

It is a general object of the invention to provide transparent windows or enclosures for aircraft, and the like, embodying simple, dependable light-weight and inexpensive means for preventing failure of the basic or primary enclosure member or members by protecting the critical or tension surface of the enclosure against externally caused damage.

Another object of the invention is to provide a protective shield means for effectively protecting the critical or tension side of a pressurized transparent enclosure. The shield means of the invention physically covers, or substantially covers, the critically sensitive side of the enclosure to prevent contact of nicking, pitting, scratching and abrading agents with the primary enclosure member, to absorb impact shocks that might well cause damage to the primary member and by reason of being thin, flexible and cushioned, resists impact damage to the enclosure.

Another and important object of the invention is to provide an enclosure of the character referred to characterized by a shield means for the critically sensitive outer or tension side of the enclosure, which shield means carries little or relatively none of the normal load on the enclosure and, therefore, is more resistant to impact fracture and prevents sudden or violent redistribution of the load in the event the shield means is damaged. Aircraft windows, transparent enclosures, and the like, may be classified as "monolithic" where there is a single integral member and "laminated" where there are two or more laminae bonded together to form the enclosure. In the monolithic type of enclosure the single layer or member of course carries all the loads to which the enclosure is subjected and in the laminated type of enclosure each of the laminae is "structural" in the sense that it carries a portion of the load. In the event of fracture in either type of structure there is a sudden and violent redistribution of the load and oftentimes this results in destructive failure of the enclosure. In the enclosures of the present invention the protective shield means in intentionally constructed and arranged to carry only a very small portion of the load, making it very resistant to fracture and preventing a violent redistribution of load in the event of damage.

Another object of the invention is to provide an enclosure of the class described in which the protective shield means is characterized by a hard surface layer of suitable transparent material resistant to abrasion, chipping, etc. and a relatively soft but tough backing layer or interlayer, these layers being laminated together and bonded to the critical outer side of either a transparent monolithic enclosure panel or a transparent laminated enclosure, the relatively soft, tough backing layer serving as an effective crack barrier and cushion for the hard outer layer and as a thermal barrier. The tough but relatively soft layer is effective in preventing or limiting the propagation of cracks in the harder layers and, therefore, may well prevent total destruction of the enclosure in event of crack damage. This layer being soft, has been found to cushion the hard protective outer shield layer so that gravel impact damage and like damage to the same is minimized, the dents or nicks formed in the cushioned hard outer layer as a result of gravel impact, etc. being considerably smaller than those produced in similar uncushioned hard layers.

Another object of the invention is to provide transparent enclosures of the kind described in which the protective shield means may be relatively thin to permit the maximum concentration of material in the load assuming main panel or enclosure layer or layers and the unbalanced construction of the enclosure may be such as to obtain maximum bending stiffness.

While we have hereinabove specifically referred to the "outer" surface of an enclosure, or the like, as being critically sensitive to damage it is to be understood that in some instances the inner surface of an enclosure may be sensitive to damage. For example, a cockpit canopy may by reason of its configuration be critically sensitive to damage at at least some portion of its inner surface, such portion or portions being under tension. Accordingly, the invention is to be construed as applicable to either or both surfaces of an enclosure.

A further object of the invention is to provide a transparent enclosure of the class described herein having good optical properties and wherein the protective shield means does not interfere with or complicate the mounting or attachment of the enclosure. The shield means is such that it may be employed on or with enclosure means, canopies, windshields, panels, etc. having any selected or required type or class of edge attachment or mounting means.

Other objectives and features of the invention will become apparent from the following detailed description of typical preferred forms and applications of our invention, throughout which description reference will be made to the accompanying drawings wherein:

Figure 1 is a side elevation of an airplane incorporating windows and a cockpit enclosure incorporating the invention;

Figure 2 is an enlarged fragmentary front or side elevation of a window or enclosure of the invention and the adjacent portion of the airplane;

Figure 3 is a fragmentary vertical sectional view taken substantially as indicated by line 3—3 on Figure 2;

Figure 4 is a vertical sectional view taken as indicated by line 4—4 on Figure 2;

Figure 8 is an enlarged fragmentary vertical sectional view taken substantially as indicated by line 8—8 on Figure 1 showing the invention incorporated in a canopy type of enclosure.

Figure 5:
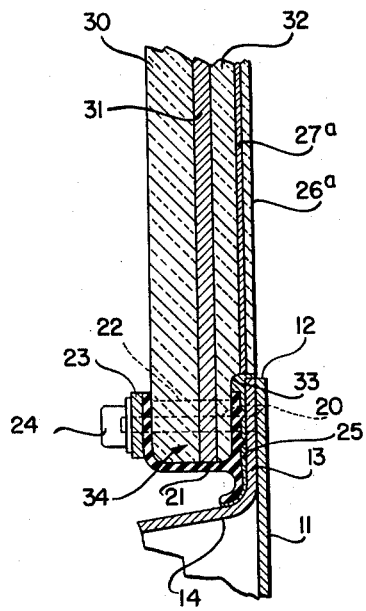
Figure 5 is a view similar to Figure 3 illustrating the invention incorporated in another type or form of enclosure.

The present invention is capable of embodiment in or application to transparent panels, enclosures, canopies, windshields, etc. intended for use on vehicles of various kinds and in other structures and instrumentalities. In the drawings we have shown the invention incorporated or embodied in window enclosures and in the canopy of an airplane 10, it being understood that these are merely typical applications and are not intended to limit or restrict the scope or field of usefulness of the invention. It will be assumed that the airplane 10 is pressurized, that is during flight the air pressure maintained within the fuselage is in excess of the ambient atmospheric pressure so that a pressure differential exists across the windows W and across the pilot or cockpit canopy C. In the case of the windows W it is the common practice to provide each window opening or aperture with two spaced transparent panes or enclosures in order to eliminate or reduce fogging, the outer enclosure usually being the pressurized or load assuming element. The window panels or enclosures illustrated in the drawings are these outer loaded or pressurized members or elements, the inner panes or panels not being illustrated.

In Figures 2, 3 and 4, the skin 11 of the airplane fuselage has an opening 12 and a member 13 is secured to the inner side of the skin to lie thereagainst and then extend inwardly away from the skin at 14. The transparent window enclosure of the invention extends across the window opening 12 and has its margins secured, anchored, or attached at the opening in any preferred or selected manner. The window enclosure in this case includes a principal or main panel or layer 15 of a transparent material such as a polyester resin, methyl methacrylate resin, chlorinated resins, or allyl resins having good physical and optical properties. Where the enclosure has a single main layer of this kind it may be considered a monolithic panel or enclosure. The main layer 15 in this particular application of the invention is reduced in thickness adjacent its margin so as to have a reduced thickness rim portion 16 to fit within the member 13 and to have its outer side generally flush with the skin 11, the outer side of the panel being somewhat recessed from the skin surface, as seen in Figure 3. The provision of the reduced thickness rim portion 16 leaves a continuous shoulder 17 on the outer side of the main layer 15 and this shoulder 17 preferably lies slightly inward of the walls of the opening 12, that is it fits within the opening 12 with suitable clearance.

In the construction illustrated in Figures 2, 3 and 4 the marginal portions 16 of the main panel 15 are scalloped, having spaced scallops or notches 18 for receiving the attaching or securing screws or bolts 20. A channeled seal strip 21 of rubber, synthetic rubber, rubber composition, or the like, embraces the marginal rim 16 and has enlargements or bushing portions 22 occupying the scallops 18 to engage around the bolts 20 and to space the same from the walls of the scallops. A clamping plate 23 is engaged against the inner side of the seal strip 21 and the nuts 24 on the bolts 20 urge the plate outwardly or toward the skin 11 so that the margin of the window enclosure is clamped or held in the channel strip 21 and secured to the skin structure of the airplane. Elastomeric sealing material 25 is preferably provided at the inner side of the skin member 13 to seal with the channel strip 21 and rim portion 16 of the enclosure to perfect the seal. From the foregoing it will be seen that the internal air pressure, that is the air pressure within the fuselage of the airplane acts outwardly against the window enclosure layer 15 so that the outer surface of this layer is under tension. Being thus under tension this surface of the transparent plastic layer 15 is critically sensitive to impact, abrasion, scratching and other damage.

The protective shield means of the invention includes an outer hard surface protective layer 26 and a softer, tougher interlayer or laminae 27 between the outer layer 26 and the outer critically sensitive surface of the main enclosure layer 15. The protective shield layers 26 and 27 preferably cover the otherwise exposed outer side of the main layer 15 and, as illustrated, these protective layers may have their edges or margins flush or coincident with the shoulder 17 of the main layer. The three laminae or layers 15, 26 and 27 are intimately bonded together as by a suitable transparent cement such as a solvent cement or a thermo-setting cement or as by the application of heat and pressure so as to constitute a single panel or enclosure element. However, in this connection it is to be observed that the protective layers 26 and 27 remain substantially unloaded during in-flight operations, the layers 26 and 27 being spaced clear of or somewhat remote from the secured or anchored rim region 16 of the panel.

The outer hard surface protective layer 26 may be a polyester, or the equivalent, such as methyl methacrylate, nylon, unplasticized vinyls, chlorinated resins or allyl resins to present a wear resistant, weather resistant and impact resistant skin for the panel or enclosure. However, the interlayer 27 is preferably a softer, tougher and more flexible material such as plasticized polyvinyl butyral, cross-linked polyvinyl butyral, nylon, polyester or silicone. This interlayer 27 constitutes a cushion for the harder outer layer 26 so that the effects of ice pellet, gravel and sand impact and like damage produces a minimum of injury to the outer layer, and constitutes a crack resistant and tear resistant barrier reducing the propagation of cracks in both the main layer 15 and the outer layer 26 and isolating the cracks that may develop in either layer, one from the other. The layer 27 constitutes a flexible mechanical joinder or connection between the two more brittle, hard layers 15 and 26 so that the development of a crack in, say, the main layer 15, or, say, in both the layers 15 and 26, will not result in total failure of the enclosure or even major parting or separation or fracture of the enclosure components. Additionally, the interlayer 27 acts as an effective thermal barrier reducing the transmission of heat from the main enclosure panel 15 to the hard surface outer layer 26. Although the thickness and relative thicknesses of the protective shield layers 26 and 27 may be varied considerably as found most desirable in given applications, it will usually be preferred to make both of these layers quite thin. For example, in the case of a typical airplane window enclosure the thickness of the hard surface outer layer 26 may be not greater than 20% and usually not greater than 10% of the total thickness of the enclosure and the thickness of the more flexible, tough, interlayer 27 may be not greater than 20% and usually not greater than 10% of the total enclosure thickness.

It is desirable to seal the edges of the protective shield layers to prevent the entrance of water and other contaminants between the laminae 15, 26 and 27 and thereby prevent delamination of the panel and the weakening of the bonds between the several layers. This may be accomplished by thoroughly cleaning the edges of the shield layers 26 and 27 and the surface of the adjacent shoulder 17 and then applying a primer coating of a Thiokol-based sealant thinned with methylethyl ketone, cyclo hexanone and lacquer thinner. After the primer has dried a brush coat of a bodied Thiokol-based sealant or other suitable sealing compound is applied. Of course other suitable sealants or sealing procedures may be used to protect the margins of the layers 26 and 27.

It will be observed from an inspection of Figures 3 and 4 of the drawings that the protective shield made up of the layers 26 and 27 is relatively thin so as to lie within the confines of the opening 12. In fact the protective shield made up of the layers 26 and 27 may assist in fairing the enclosure out of approximately the plane of the skin 11 to reduce aerodynamic drag.

It is believed that the general features and mode of operation of the window enclosure illustrated in Figures 2, 3 and 4, will be apparent from the foregoing detailed description. During flight of a typical pressurized airplane the pressure differential across a window enclosure may be as high as 8.0 p. s. i. to 10.0 p. s. i. and the temperature at the outer side of the enclosure may range between −65 and +160° F. while the temperature at the inner side of the enclosure will remain in the range of from about +40 to +160° F. The outer surface of the enclosure may be subjected to relatively high velocity ice pellet impact during flight and to gravel particle and sand impact during takeoff and landing. Furthermore, the enclosure may suffer impact damage during installation, servicing of the airplane, etc., and may be scratched or abraded when washed, etc. We have determined that chipping of the outer surface of a pressurized monolithic window enclosure of polyester resin simulating gravel impact at relatively high velocity, results in the formation of fissures in the outer surface which reduced the bending strength of the enclosure material by from 80 to 85% and resulted in explosive failure of the enclosure at relatively low applied pressures. On the other hand the same kind of impact on a correspondingly pressurized enclosure provided with the protective shield means of Figures 2, 3 and 4, produced only very minor indentations in the hard outer layer 26 and produced virtually no change in the bending strength of the enclosure or in the material of the layer 15. The impact of numerous gravel particles having a velocity of about 450 M. P. H. upon the outer layer 26 of the protective shield of course damaged the layer 26 but the enclosure structural layer 15 remained unaffected and the enclosure successfully withstood 8 lbs. per square inch applied pressure after this test. Again, even after the outer layer 26 had been completely destroyed or perforated at several points by high velocity sand impact so as to expose the softer, tougher inner layer 27, the enclosure remained structurally sound and continued to withstand 10 p. s. i. pressure. It is believed that the shock absorbing ability of the tough but somewhat yielding interlayer 27 of the protective shield means accounts for relatively minor damage to the outer layer 26 by gravel impact, etc. and materially assists in protecting the main layer 15 against injury by such impact. In still another test intentional cracking of the main enclosure layer 15 so as to have cracks extend completely through it from one side to the other and from one edge to another did not result in failure of the enclosure and the enclosure thus damaged continued to hold over 5 p. s. i. applied air pressure. The interlayer 27, being tough and flexible, resists tearing and separation even after such severe breakage of the main structural layer 15 and thus prevents complete failure or explosive failure of the enclosure. Accordingly an enclosure provided with the protective shield means of the invention "fails safe," that is it does not shatter, disintegrate or fail explosively even after severe damage to the main structural layer 15.

Figure 5 of the drawings illustrate the invention embodied in a laminated type window enclosure. In this construction the enclosure includes a main inner layer 30 of polyester resin, methyl methacrylate resin, chlorinated resin, allyl resin, or the like, an interlayer or laminae 31 of plasticized polyvinyl butyral and an outer main layer 32 of polyester resin, or the like. These transparent layers 30, 31 and 32 are laminated and bonded together to constitute the load assuming panel and the layer 32 may have a shoulder 33 corresponding to the shoulder 17 above described so that the panel has a reduced thickness marginal portion 34 corresponding to the portion 16 of Figures 2, 3 and 4. This marginal portion 34 is received in the channeled strip 21 of rubber, or the like, and secured or anchored to the skin 11 and member 14 by the bolts 20, clamp plate 23, and nuts 24, in the same manner as the portion 16 of Figures 2, 3 and 4.

The protective shield means of Figure 5 includes a hard surface layer 26ᵃ corresponding with the layer 26 and a more yielding flexible but tougher interlayer 27ᵃ between the outer surface of the structural panel layer 32 and the outer protective layer 26ᵃ. The layers 26ᵃ and 27ᵃ may be of the same materials as their corresponding layers 26 and 27, already described, and have corresponding functions. The margins of the layers 26ᵃ and 27ᵃ are preferably at the shoulder 33 and are preferably sealed in the same manner as the edges of the layers 26 and 27 to prevent the entrance of contaminants to the softer layer 27ᵃ. The enclosure of Figure 5 has the same general features and mode of operation as the enclosure of Figures 2, 3 and 4. The protective shield means 26ᵃ—27ᵃ protects the principal or structural laminae 30, 31 and 32 against damage from gravel and ice pellet impact, scratching, chipping, abrasion, etc. due to handling, servicing and cleaning operations, and in the event of major damage to the primary laminae, prevents complete failure, exposive failure, and delamination of the enclosure. The tough, flexible interlayer 27ᵃ prevents or reduces the propagation of cracks and prevents sudden redistribution of stresses in the event of impact damage, or the like, acting in the same manner as the layer 27 above described.

Figure 6:
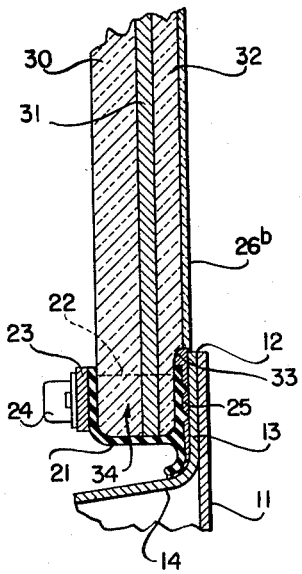
Figure 6 is also a view similar to Figure 3 illustrating still another form of the invention.

Figure 6 illustrates a simple enclosure of the invention characterized by a single layer protective shield. We have shown this protective means on the laminated type of enclosure including the laminae 30, 31 and 32, it being apparent that it may be employed on the monolithic type of enclosure if desired. The shield comprises a relatively thin layer 26ᵇ of transparent polyester resin, methyl methacrylate resin, chlorinated resin, allyl resin, or the like, laminated or bonded directly to the outer surface of the layer 32. The edge or margin of the protective shield layer 26ᵇ is at or coincident with the shoulder 33 and the edge of the protective layer and the adjacent regions of the shoulder 33 are preferably sealed as in the construction of Figure 5. The shield layer 26ᵇ is relatively unloaded or unstressed so that impact damage, scratch damage, etc. thereto is not propagated in the structural layers but is usually confined to the shield layer itself. It is believed that the protective shield means of Figure 5 will, in most cases, be preferred to that of Figure 6 although the simple and less expensive arrangement of Figure 6 may be useful and effective in many situations or applications.

Figure 7:
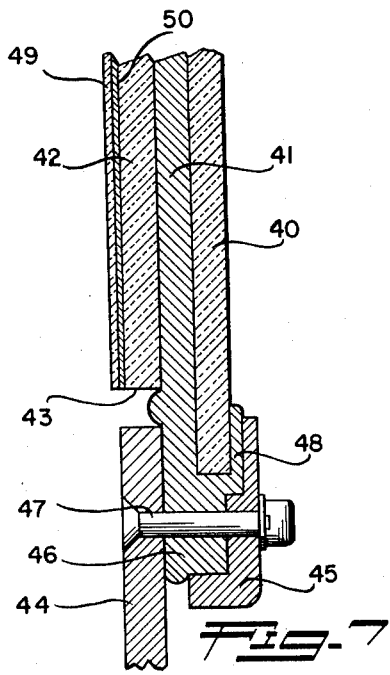
Figure 7 is a fragmentary vertical sectional view of a window or enclosure structure of the invention illustrating another kind of edge attachment means.

Figure 7 illustrates a protective shield arrangement of the invention embodied in a window enclosure, or the like, having a different type of edge attachment. The enclosure of Figure 7 is of the multi-layer or laminated type and includes an inner laminae 40 of transparent polyester resin, methyl methacrylate resin, chlorinated resin, allyl resin, or the like, an intermediate laminae 41 of plasticized polyvinyl butyral, cross-linked polyvinyl butyral, nylon, polyester, silicone, or the like, and an outer layer or laminae 42 of transparent polyester resin, methyl methacrylate resin, chlorinated resin, allyl resin, or the like, these three layers being bonded together throughout under heat and pressure, or otherwise intimately bonded to constitute a single unit. In this type of construction the more flexible, softer and yet tougher laminae 41 extends beyond the margin of the enclosure and is utilized to mount or support the enclosure. It will be seen that the layer 41 extends a considerable distance beyond the edge 43 of the outer layer 42 and has a thickened rim portion 46 engaged at one side by a skin or member 44 of the airplane, or the like, and, on the other side by a securing or clamping plate 45. Screws or bolts 47 pass through openings in the member 44, rim portion 46 and plate 45 to secure the enclosure. The rim portion 46 of the intermediate layer 41 may have a lip or flange 48 overlying a protruding edge portion of the inner layer 40 and the plate 45 may in turn engage over the flange 48 so that the marginal region of the inner layer 40 is nested or seated in the thickened rim portion 46 of the layer 41 which, in turn, is clamped between the member 44 and the plate 45.

The protective shield means of Figure 7 includes a protective outer layer 49 of transparent polyester resin, or the like, and a transparent interlayer 50 of plasticized polyvinyl butyral or other flexible, tough, transparent material bonded or laminated between the layer 42 and the outermost layer 49. The thickness of the layer 49 may not be greater than 20% and usually not greater than 10% of the total thickness of the enclosure and the thickness of the layer 50 may be not greater than 20% and is usually not greater than 10% of the total enclosure thickness. The protective layers 49 and 50 preferably have their margins at or coincident with the marginal edge 43 of the layer 42 and these edge surfaces or regions are preferably sealed in the same manner as the edges of the layers 26 and 27 above described. It will be observed that the protective shield means 49—50 of Figure 7 is substantially unloaded so that impact damage, or the like, at the outer side or face of the enclosure is confined to the layer 49 and is not propagated in the enclosure proper. Furthermore, the layer 50 acts as a cushion for the outer layer 49 so that damage even to the protective outer layer is minimized. In general, the protective shield means 49—50 of Figure 7 operates in the same way as the shield means of Figures 2, 3 and 4 and Figure 5. However, it will be observed that in this case the enclosure itself is mounted or supported through the medium of the tough, flexible interlayer 40 of polyvinyl butyral, or the like, so as to be inherently resistant to damage and so as to effectively resist explosive failure, etc.

Figure 8 illustrates the invention applied to or embodied in a transparent canopy type enclosure. The particular canopy 60 illustrated is of the monolithic type constituting a single layer or thickness of transparent polyester resin, methyl methacrylate resin, chlorinated resin, allyl resin, or the like, although insofar as our present invention is concerned the canopy proper may be of the laminated type including two, three or more layers of transparent materials bonded one to the other. Any selected or required type of edge attachment may be employed to secure the canopy 60. In the drawings we have shown an edge attachment or securing means of the type described and claimed in the application of V. B. Koriagin, Serial No. 226,411, filed May 15, 1951, now U. S. Pat. No. 2,730,777. This attachment includes one or more layers 61 of nylon fabric, Orlon fabric, Fibreglas fabric, or other strong fabric, cemented or laminated to the opposite sides of the canopy 60 along its margin and extending therefrom in such a manner as to form a loop 62. The loop 62 contains one or more rods 63 and is received in a groove 64 formed in the opposing surfaces of two members 65 and 66. The member 65 is secured to the airplane structure 68 by bolts 67, or the like, and the member 66 is, in turn, riveted or otherwise suitably secured to the member 65. This arrangement is such that the loop 62, while being confined in the groove 64 to positively prevent detachment of the canopy, is free to move longitudinally with respect to the members 65 and 66 and to have angular movement with respect thereto. This mode of attachment of the canopy prevents thermal expansion and contraction of the canopy from producing loads or stresses therein.

Figure 9:
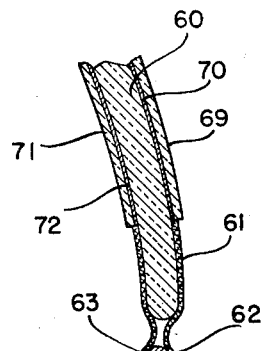
Figure 9 is a fragmentary sectional view of another canopy embodying the invention.

The protective shield means of Figure 8 includes a transparent outer protective layer 69 of polyester resin, methyl methacrylate resin, chlorinated resin, allyl resin, or the like, and an interlayer 70 of plasticized polyvinyl butyral, or the like, laminated between the layer 69 and the outer surface of the canopy 60. The layers 69 and 70 correspond in arrangement, construction and function to the layers 26 and 27, 26$^a$ and 27$^a$, and 49 and 50, above described. However, in this case the layers 69 and 70 conform in curvature and configuration to the streamlined canopy 60. The protective shield layers 69 and 70 preferably have their margins at or adjacent the margin of the edge attachment fabric 61 and are preferably sealed in the same manner as the edges of the layers 26 and 27. The shield layers 69 and 70 serve to effectively protect the canopy 60 against damage by impact, scratching, abrasion, etc. and prevent explosive failure of the pressurized canopy. As noted above, a canopy, by reason of its configuration, may have its inner surface, or at least a portion or portions thereof, under tension to be sensitive to injury. Accordingly, in Figure 9 we have shown the inner side of the canopy 60 provided with a protective shield means. This shield means may include layers 71 and 72 corresponding in material, arrangement and function to the respective layers 69 and 70 on the outer surface of the canopy. It will be seen that in practice a given enclosure such as a canopy may have the protective shield means of the invention on either one or both of its surfaces.

Having described only typical forms of the invention we do not wish to be limited to the specific details herein set forth, but wish to reserve to ourselves any variations or modifications that may appear to those skilled in the art and fall within the scope of the following claims.

We claim:

1. In combination; an aircraft having an aperture, a transparent enclosure for the aperture, the enclosure having a rim portion of reduced thickness leaving a shoulder on the outer side of the enclosure, means cooperating with said rim portion and attaching the enclosure to the aircraft so as to extend across and close the aperture, and protective shield means for the enclosure including an outer layer of transparent synthetic resin, and an interlayer of softer, flexible, tough polyvinyl butyral resin between the outer side of the enclosure and said outer layer, the margins of said layers being substantially coincident with said shoulder.

2. In combination; an aircraft having an aperture, an enclosure of transparent synthetic plastic material for the aperture, the enclosure having a rim portion of reduced thickness leaving a shoulder on the outer surface of the enclosure, attachment means cooperating only with the rim portion of the enclosure securing the enclosure to the aircraft so as to extend across and close the aperture, a layer of yielding flexible transparent polyvinyl butyral on the outer surface of the enclosure, and a layer of transparent synthetic resin on the outer surface of the first named layer harder than the first layer, said layers having their marginal edges adjacent said shoulder.

3. In combination; an aircraft having an aperture, an enclosure of transparent synthetic plastic material for the aperture, the enclosure having a rim portion of reduced thickness leaving a shoulder on the outer surface of the enclosure, attachment means cooperating only with the rim portion of the enclosure securing the enclosure to the aircraft so as to extend across and close the aperture, a layer of yielding flexible transparent material on the outer surface of the enclosure, and a layer of transparent synthetic resin on the outer surface of the first named layer and harder than the first named layer, the margins of said layers being substantially coincident with said shoulder and the layers each having a thickness of from 10 to 20% of the total thickness of the enclosure.

4. Canopy enclosure means for an aircraft comprising a canopy of transparent material, means on the edge region of the canopy for mounting the same, a layer of of tough, flexible transparent polyvinyl butyral on the outer surface of the canopy, and a layer of harder transparent synthetic resin on the first mentioned layer, said layers having their margins clear of said attaching means, the thickness of each of said layers being not greater than from 10 to 20% of the total thickness of the enclosure.

5. Enclosure means for pressurized aircraft comprising a transparent enclosure including a plurality of laminae at least one of which is formed of a tough, flexible synthetic resin, said one lamina extending at its margin beyond all other parts of the enclosure, means engaging with said extending lamina for attaching the enclosure, and protective shield means on the outer side of the enclosure including a layer of tough, flexible, transparent polyvinyl butyral on the outer surface of the enclosure and a transparent layer of harder synthetic resin on the outer side of the first named layer, the thickness of each of said layers being not greater than from 10 to 20% of the total thickness of the enclosure.

6. An aircraft enclosure adapted to resist internal pressures and exposed to external abrasion and impacts comprising a transparent main load assuming panel presenting an inner surface directly exposed to said pressures and presenting an outer surface, and protective shield means for the load assuming panel comprising an interlayer of transparent synthetic resin on said outer surface of said panel, and an outer layer of transparent synthetic resin superimposed on the interlayer, the synthetic resin of the interlayer being tougher and more flexible than the materials of which said panel and outer layer are constructed, said panel including a marginal mounting region protruding beyond said interlayer and outer layer to mount the main panel and transmit substantially all of said pressures thus leaving the protective shield means substantially unloaded.

7. An aircraft enclosure adapted to resist internal pressures and exposed to external abrasion and impacts comprising a transparent main load assuming panel presenting an inner surface directly exposed to said pressures and presenting an outer surface, and protective shield means for the load assuming panel comprising an interlayer of transparent polyvinyl butyral resin on said outer surface of said panel, and an outer layer of transparent polyester resin superimposed on the interlayer, the resin of the interlayer being tougher and more flexible than the materials of which said panel and outer layer are constructed, said panel including a marginal mounting region protruding beyond said interlayer and outer layer to mount the main panel and transmit substantially all of said pressures thus leaving the protective shield means substantially unloaded.

8. An aircraft enclosure subjected to air pressure differentials comprising a main load assuming transparent panel presenting two opposite surfaces, one an external surface the other an internal surface, protective shield means on one of said surfaces comprising an interlayer of transparent plastic on one of said surfaces and an outer layer of transparent synthetic resin superimposed on the interlayer, said panel and said outer layer being harder and less flexible than the material of said interlayer, said main panel having a marginal mounting portion protruding beyond said interlayer and said outer layer to mount the panel thus avoiding the transmission through said interlayer and outer layer of the loads resulting from said pressure differentials.

9. An aircraft enclosure subjected to air pressure differentials comprising a main load assuming transparent panel presenting two opposite surfaces, one an external surface the other an internal surface, protective shield means on one of said surfaces comprising an interlayer of transparent plastic cemented on one of said surfaces and an outer layer of transparent polyester resin cemented on the interlayer, said interlayer and outer layer having conterminal margins and said main panel having a marginal region protruding beyond said margins to mount the panel to substantially avoid the transmission of said pressure differentials through the protective shield means.

10. An aircraft enclosure adapted to resist internal pressure and exposed to external abrasion and impact comprising a pressure assuming main panel or transparent polyester resin presenting an inner surface directly exposed to said pressures and presenting an outer surface, and abrasion and impact protective shield means for said outer surface comprising a layer of transparent polyvinyl butyral cemented to said outer surface of the main panel, and an outer layer of transparent polyester resin cemented on the first named layer, said layers having substantially coterminous margins and said main panel including a marginal region extending beyond said margins to mount the panel so that said shield means is substantially free of the loads incident to said pressure.

11. An aircraft enclosure adapted to resist internal pressure and exposed to external abrasion and impact comprising a pressure assuming main panel of transparent polyester resin presenting an inner surface directly exposed to said pressures and presenting an outer surface, and abrasion and impact protective shield means for said outer surface comprising a layer of transparent polyvinyl butyral cemented to said outer surface of the main panel, and an outer layer of transparent polyester resin cemented on the first named layer, the aggregate thickness of said layers being less than the thickness of said panel, said layers having substantially coterminous margins and said main panel including a marginal region extending beyond said margins to mount the panel so that said shield means is substantially free of the loads incident to said pressure.

12. An aircraft enclosure adapted to resist internal pressure and exposed to external abrasion and impact comprising a pressure assuming main panel of transparent polyester resin presenting an inner surface directly exposed to said pressures and presenting an outer surface, and abrasion and impact protective shield means for said outer surface comprising a layer of transparent polyvinyl butyral cemented to said outer surface of the main panel, and an outer layer of transparent polyester resin cemented on the first named layer, each of said layers having a thickness not greater than 20% of the total thickness of the enclosure, said layers having substantially coterminous margins and said main panel including a marginal region extending beyond said margins to mount the panel so that said shield means is substantially free of the loads incident to said pressure.

13. An aircraft enclosure subjected to air pressure differentials comprising a main load assuming transparent panel presenting two opposite surfaces, one an external surface the other an internal surface, protective shield means on one of said surfaces comprising an interlayer of transparent polyvinyl butyral on one of said surfaces and an outer layer of transparent synthetic plastic superimposed on the interlayer and harder and less flexible than the interlayer, each of said layers having a thickness not greater than from 10 to 20% of the total thickness of the enclosure, said layers having substantially coterminous margins, said main panel having a marginal portion of reduced thickness extending beyond said margins to mount the enclosure.

(References on following page)

References Cited in the file of this patent

UNITED STATES PATENTS

| | | |
|---|---|---|
| 1,777,309 | Hopkinson | Oct. 7, 1930 |
| 2,047,253 | Brooks | July 14, 1936 |
| 2,193,393 | Danner | Mar. 12, 1940 |
| 2,258,724 | Wagner et al. | Oct. 14, 1941 |
| 2,300,506 | Kamerer | Nov. 3, 1942 |
| 2,367,035 | McConnell et al. | Jan. 9, 1945 |
| 2,379,194 | Shouts et al. | June 26, 1945 |
| 2,414,520 | Greenwald | Jan. 21, 1947 |
| 2,456,467 | Swedlow | Dec. 14, 1948 |
| 2,464,826 | Neher et al. | Mar. 22, 1949 |
| 2,473,616 | Stephenson | June 21, 1949 |
| 2,478,714 | Schmidt | Aug. 9, 1949 |
| 2,511,168 | Martin et al. | June 13, 1950 |
| 2,679,467 | Sherts | May 25, 1954 |
| 2,696,451 | Snyder | Dec. 7, 1954 |